(12) United States Patent
Branton et al.

(10) Patent No.: US 9,697,218 B2
(45) Date of Patent: Jul. 4, 2017

(54) SYSTEMS AND METHODS FOR PROVIDING METADATA ENHANCED FILENAMES

(75) Inventors: Paul K. Branton, Rochdale (GB); Richard J. Somerfield, Cheshire (GB)

(73) Assignee: AppSense Limited, Warrington (GB)

(*) Notice: Subject to any disclaimer, the term of this patent is extended or adjusted under 35 U.S.C. 154(b) by 332 days.

(21) Appl. No.: 13/552,988

(22) Filed: Jul. 19, 2012

(65) Prior Publication Data
US 2014/0025636 A1   Jan. 23, 2014

(51) Int. Cl.
*G06F 17/00* (2006.01)
*G06F 17/30* (2006.01)

(52) U.S. Cl.
CPC ........ *G06F 17/3012* (2013.01); *G06F 17/301* (2013.01); *G06F 17/30997* (2013.01)

(58) Field of Classification Search
CPC ........... G06F 17/3012; G06F 17/30067; G06F 17/301; G06F 17/30194; G06F 17/3007; G06F 17/30997; G06F 2212/466; G06F 2212/7207
USPC ... 707/728, 722, E17.014, E17.01, E17.095, 707/E17.102–E17.103, 609, 705, 707/821–828, 622, 646, 694, 752, 758, 707/769
See application file for complete search history.

(56) References Cited

U.S. PATENT DOCUMENTS 7,330,863 B2 * 2/2008 Carro
8,560,579 B1 * 10/2013 Gross ..................... H04L 43/50
707/609
2003/0200193 A1   10/2003 Boucher
2006/0259516 A1 * 11/2006 Stakutis et al. ............... 707/200
2007/0276883 A1 * 11/2007 Kumar ................ G06F 11/3495
2008/0059495 A1 *  3/2008 Kiessig et al. ............... 707/100
2011/0184964 A1 *  7/2011 Li ................................ 707/756

FOREIGN PATENT DOCUMENTS

WO   WO-2004049199 A2   6/2004

OTHER PUBLICATIONS

Warwick "File Permissions and Basic Unix Commands" created Nov. 17, 2000.*
HP-UX_Reference(1), Release 11.0, vol. 1 of 5 Copyright 1997 Hewlett Packard.*
Warwick "File Permissions and Basic Unix Commands" Created on Nov. 17, 2000.*
UK Search Report mailed on Oct. 25, 2013 for co-pending UK Application No. GB1307399.4, 5 Pages.
http://www.controlledvocabulary.com/imagedatabases/filename2title.html, printed on Dec. 14, 2012, 4 pages.
(Continued)

*Primary Examiner* — Jason Liao
*Assistant Examiner* — Berhanu Mitiku (57) ABSTRACT

Described are computer-based methods and apparatuses, including computer program products, for metadata enhanced filenames. A filename is received, the filename including a first set of characters that represents a name for the electronic file, and a second set of additional characters. The filename is parsed to identify the second set of additional characters. Metadata associated with the electronic file is determined based on the second set of additional characters without downloading additional data of the electronic file. The electronic file is processed based on the determined metadata.

12 Claims, 5 Drawing Sheets

(56) References Cited

OTHER PUBLICATIONS http://en.wikipedia.org/wiki/Bitly, printed on Dec. 14, 2012, 3 pages.
http://en.wikipedia.org/wiki/Representational_state_transfer, printed on Dec. 14, 2012, 8 pages.

* cited by examiner

SYSTEMS AND METHODS FOR PROVIDING METADATA ENHANCED FILENAMES

TECHNICAL FIELD

The technical field relates generally to computer-based methods and apparatuses, including computer program products, for metadata enhanced filenames.

BACKGROUND

With the proliferation of online data storage (e.g., using file servers, cloud providers, etc.), there is usually no consistent way to add custom information to a file, such as metadata, that can be accessed easily by remote devices. For example, remote directory listings usually only return standard information for electronic files, such as the filename, the file type (e.g., a text file (.txt), a Microsoft Office Excel spreadsheet (.xls), Adobe Acrobat PDF (.pdf), etc.) and the file size. Access to other custom information may not be not available in a standard directory listing. Further, to the extent that directory information is even available, it is usually not consistent across different products and platforms. For example, even for an identical file on both a Microsoft® server and Dropbox™, different information is available: from the Windows® server, a requesting device can not deduce whether a thumbnail exists, and file attributes are not available from Dropbox™. Additionally, moving files between different platforms (e.g., between a Microsoft® server and Dropbox™) risks losing portions of metadata associated with the file. Also, it is often difficult and impractical (e.g., for scalability reasons) to modify an underlying product to provide additional data about the files.

Metadata can be added to an electronic file by storing it in the electronic file itself. The metadata can be encoded in both a standard formats (e.g., as tags used in most Windows® document types) or custom formats (e.g., particular to the file or the operating system). However, storing the metadata in the file requires client software to download the file (or at least parts thereof) to access the metadata. Therefore, additional data download may be required to access the metadata, which requires a further network step, which can in-turn slow down transactions and increase the amount of data transferred over a potential pay per byte connection. In addition, metadata for different files may be encoded in different formats, requiring custom code for each format to extract the meta data.

SUMMARY

The computerized methods and apparatus disclosed herein provide for metadata enhanced filenames. A brief summary of various exemplary embodiments is presented. Some simplifications and omissions may be made in the following summary, which is intended to highlight and introduce some aspects of the various exemplary embodiments, but not limit the scope of the invention. Detailed descriptions of a preferred exemplary embodiment adequate to allow those of ordinary skill in the art to make and use the inventive concepts will follow in the later sections.

In accordance with the disclosed subject matter, systems and methods are provided for determining metadata associated with an electronic file.

Disclosed subject matter includes a computerized method. The computerized method includes receiving, by a computing device, a filename including a first set of characters that represents a name for the electronic file, and a second set of additional characters. The computerized method includes parsing, by the computing device, the filename to identify the second set of additional characters. The computerized method includes determining, by the computing device, metadata associated with the electronic file based on the second set of additional characters without downloading additional data of the electronic file. The computerized method includes processing, by the computing device, the electronic file based on the determined metadata.

Disclosed subject matter includes an apparatus for determining metadata associated with an electronic file. The apparatus includes a processor and memory configured to receive a filename including a first set of characters that represents a name for the electronic file, and a second set of additional characters. The apparatus is configured to parse the filename to identify the second set of additional characters. The apparatus is configured to determine metadata associated with the electronic file based on the second set of additional characters without downloading additional data of the electronic file. The apparatus is configured to process the electronic file based on the determined metadata.

Disclosed subject matter includes a computer program product tangibly embodied in a non-transitory computer readable medium. The computer program product includes instructions being configured to cause a data processing apparatus to receive a filename including a first set of characters that represents a name for the electronic file, and a second set of additional characters. The instructions are operable to parse the filename to identify the second set of additional characters. The instructions are operable to determine metadata associated with the electronic file based on the second set of additional characters without downloading additional data of the electronic file. The instructions are operable to process the electronic file based on the determined metadata.

The techniques, which include both methods and apparatuses, described herein can provide one or more of the following advantages. Encoding the metadata (or information that can be used to access the metadata) in the filename itself allows any program to determine the metadata based only on the directory list returned from a remote server, regardless of the remote server's operating system type, system configuration, etc. Further, the meta data may indicate an action to be carried out with the file when a specific event occurs. For example, the metadata could be used to prevent deletion of a file from the server.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems and methods are provided for storing metadata in filenames (e.g., rather than storing the metadata in the file itself). A portion of the filename (e.g., a portion at the beginning of the file name, or at the end of the filename) can be used to add additional characters to the filename. A requesting device can use the additional characters to determine the metadata for a file (e.g., additional functions, requirements, information, custom actions, etc.), without downloading additional content of the file itself. In some embodiments, each additional character encodes a particular type of metadata (e.g., which is stored and retrieved on the requesting device itself, or a remote device). In some embodiments, the additional characters encode a code that is used to access the metadata. For example, the additional characters can encode a uniform resource locator (URL) that contains the metadata for the object, or a code that can be used to determine the metadata (e.g., by requesting it from a remote computer, or using the code to look up the metadata in a local database).

Figure 1:
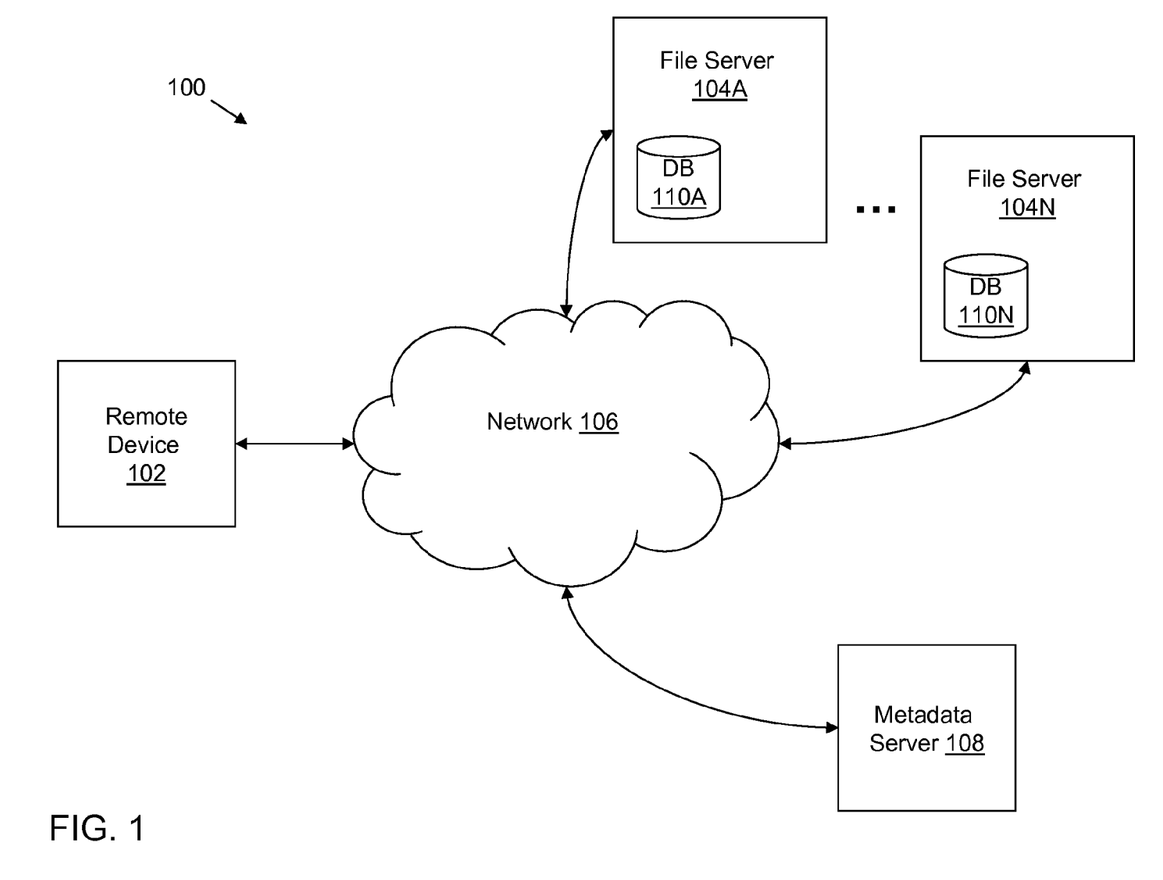
FIG. 1 is an exemplary diagram of a system for metadata enhanced filenames.

FIG. 1 is an exemplary diagram of a system 100 for metadata enhanced filenames. The system 100 includes a remote device 102. The remote device 102 can be in communication with file servers 104A through 104N (collectively file servers 104) via network 106. Each file server 104 can include an associated database 110A through 110N (collectively database 110) (e.g., data stored on a hard drive, memory, and/or other type of data storage device). The remote device 102 and the file servers 104 can be in communication with metadata server 108 via network 106. The remote device 102, the file servers 104, and the metadata server 106 can be, for example, a laptop, a personal computer, a Smartphone, and/or any other type of computing device. In some embodiments, the file servers 104 can be any computing device configured to store and share documents, such as Dropbox™, Sharefile®, SkyDrive®, and/or other file sharing devices. The remote device 102 can include software (e.g., a downloadable client application) that is configured to parse and/or enforce policies associated with the enhanced file names.

The system 100 is an example of a computerized system that is specially configured to perform the computerized methods described herein. However, the system structure and content recited with regard to FIG. 1 are exemplary only and are not intended to limit other examples to the specific structure shown in FIG. 1. As will be apparent to one of ordinary skill in the art, many different configurations of the system 100 suitable to implement the techniques described herein are possible.

In addition, information can flow between the elements, components and subsystems described herein using any technique. Such techniques include, for example, passing the information over a network (e.g., network 106) using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

Figure 2:
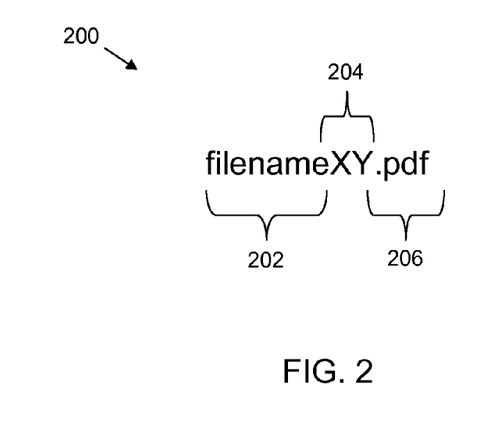
FIG. 2 is an exemplary diagram of a metadata enhanced filename.

FIG. 2 is an exemplary diagram of a metadata enhanced filename 200. The metadata enhanced filename 200 includes a set of characters (202, 204) where the first set of characters 202 represents a name for the electronic file (the "filename"), and the second set of additional characters 204 is used to add metadata to the electronic file ("XY") that is associated with the metadata enhanced filename 200. The metadata enhanced filename 200 includes file extension 206 (".pdf"), which indicates the file type. The characters used for metadata enhanced filename 200 are exemplary only, as one of skill in the art can appreciate that any filename 202, additional characters 204, and extension 206 can be used for a metadata enhanced filename 200.

While FIG. 2 shows the additional characters 204 being two characters long, the additional characters 204 can be other lengths. The additional characters 204 are preferably at a predetermined location such that the components of the system 100 know how to parse the filename 200. For example, the additional characters can be the first n bits of the filename 200, the n bits immediately preceding the file extension 206, and/or the last n bits of the filename 200 (e.g., after the filename extension 206). Furthermore, the additional characters 204 can non-consecutive (e.g., the additional characters 204 can be the first and last bits of the of the filename 200), and/or delimiters can be used to identify the additional characters 204. Other configurations of the filename 200 are possible.

Figure 3:
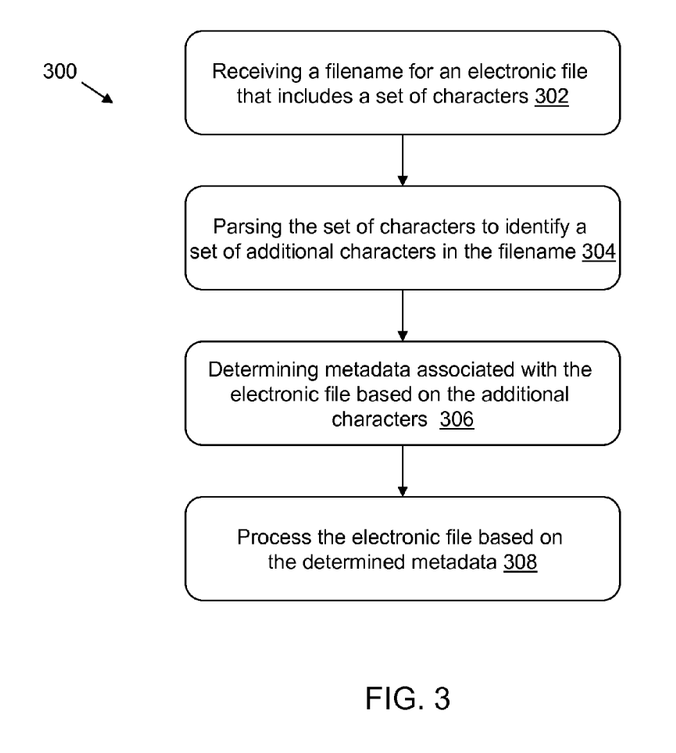
FIG. 3 is an exemplary flow chart of a computerized method for determining metadata associated with an electronic file.

Referring to FIG. 3, with further reference to FIGS. 1-2, is an exemplary flow chart of a computerized method 300 for determining metadata associated with an electronic file is shown. The method 300 is exemplary only, and can be modified by, for example, rearranging, altering, and/or omitting certain steps.

At step 302 the remote device 102 receives a metadata enhanced filename 200 for an electronic file. The filename 200 includes the first set of characters 202 that represents the name of the electronic file, and the second set of additional characters 204. In some embodiments the remote device 102 is a mobile device or a personal computer that can access a electronic file directory from the file server 104. The mobile device 102 can include a client application to process the filename 200 and/or enforce associated policies. In some embodiments, the techniques described herein allow the remote device 102 to determine metadata associated with electronic files based on just the filenames themselves (e.g., from just a directory listing transmitted by the file server 104).

At step 304, the remote device 102 (e.g., using a client application) parses the set of characters (e.g., 202, 204) to identify the second set of additional characters 204. The remote device 102 determines the additional characters that were added to the filename (e.g., which comprise the metadata for the electronic file, or can be used to access the metadata). In some embodiments, a delimiting character can be used to separate the filename 202 from the additional characters 204 (e.g., an underscore "_"). In some embodiments, the number of additional characters 204 is known, so the requesting device 102 can parse the particular number of characters from the end (or beginning) of the filename. For example, the requesting device 102 can be configured to automatically identify the additional characters 204 in the filename (e.g., based on the location of the additional characters 204, the number of additional characters, etc.).

At step 306, the remote device 102 determines metadata associated with the electronic file based on the second set of additional characters 204, without downloading additional data of the electronic file (e.g., without downloading the content of the file associated with the received filename).

At step 308, the remote device 102 processes the electronic file based on the determined metadata (e.g., preventing the deletion of a file, and/or enforcing access restrictions). For example, a client application on the remote device 102 prevents a user of the remote device 102 from deleting the electronic file (e.g., the client application prevents a delete command from executing).

Figure 4:
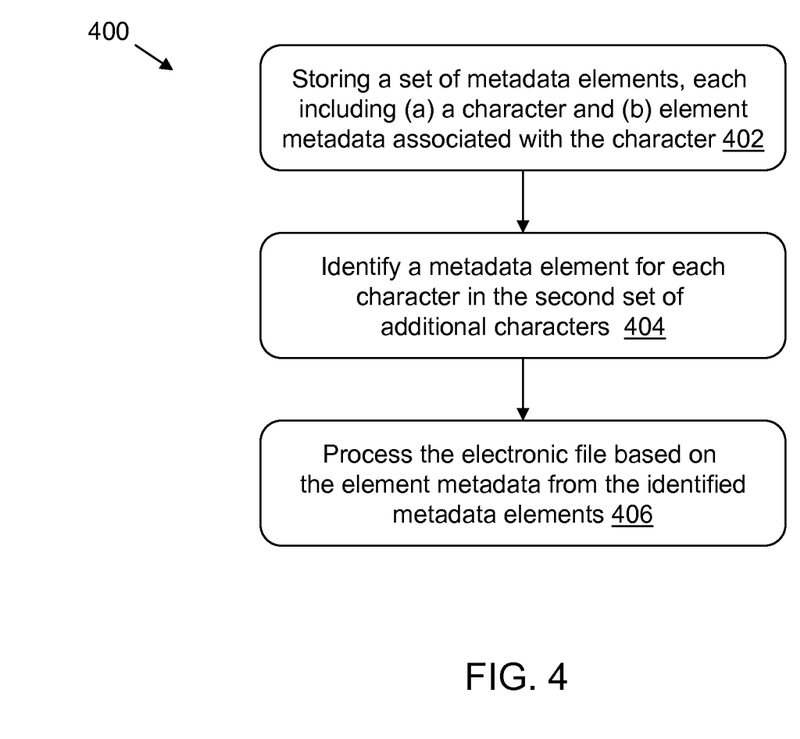
FIG. 4 is an exemplary flow chart of a computerized method for determining metadata associated with an electronic file based on characters in the filename.

In some embodiments, the additional characters 204 include characters that encode metadata for the file. FIG. 4 is an exemplary flow chart of a computerized method 400 for determining metadata associated with an electronic file based on characters in the filename. The method 400 is exemplary only, and can be modified by, for example, rearranging, altering, and/or omitting certain steps.

At step 402, the remote device 102 stores a set of metadata elements, where each metadata element includes a pair of information: a character, and element metadata associated with the character. In some embodiments each character in the additional characters 204 can be a valid filename character. In some examples, the characters A to Z and 0 to 9 are used, for a total possibility of 36 characters for each of the additional characters 204. Each of the 36 possible characters can be used to define an associated metadata element (e.g., the character "A" maps to a particular metadata element, while the character "B" maps to a different metadata element, and so on). In some examples, case sensitivity can also be used to define the additional characters 204, which increases the number of possible characters by 26, for a total of 62 characters (e.g., for situations where the file servers 104 honor case sensitivity). In some embodiments, other symbols (e.g., extended ASCII codes) can also be used to extend the number of possibilities.

Referring further to step 402, in some embodiments two additional characters 204 are added to the filename 200 (e.g., just before the end of the filename between the filename 202 and the file extension 206, as shown in FIG. 2). The two additional characters 204 can be used to perform a specific action (e.g., defined by the second character) with the file at a specific event (e.g., defined by the first character). For example, the first character (e.g., character "X" of the additional characters 204) defines an event associated with electronic file, and the second character (e.g., "Y") defines a custom action for the event. The event can be, for example, delete, download, open, or any other event that can be taken for a file. The action can be, for example, disallowing the action (e.g., the remote device 102 is prevented from deleting the file, the remote device 102 is prevented from opening the file, etc.), or performing an additional custom action in place of or in addition to the requested action for the file (e.g., display a confirmation prompt, or in addition to opening or closing the file, create a backup of the file, etc.).

Referring to step 404, for each additional character 204, the remote device identifies a metadata element from the set of metadata elements that is associated with the additional character 204. Referring to step 404, the remote device 102 identifies the metadata for the file based on the additional characters 204. For example, continuing with the example of FIG. 2, the metadata elements can include, among other elements: [X, delete], [Y, disallow action] (which are of the form ["character", "metadata"]). The remote device 102 identifies the metadata elements associated with "X" and "Y", and determines the metadata associated with character "X" requires that if deletion of the associated electronic file is requested (e.g., by a user), then according to the metadata associated with character "Y" the delete action is disallowed (e.g., such that the user can not delete the file). As another example, the metadata elements can include: [X, save], [Y, create backup]. The remote device 102 identifies the metadata elements associated with "X" and "Y", and determines the metadata requires that if a save of the associated electronic file is requested, then a backup is created of the electronic file in addition to (or instead of) saving the file.

At step 406, the remote device 102 (e.g., using a client application) processes the electronic file based on the set of element metadata identified for each character in the additional characters 204. In some embodiments, the remote device 102 receives a request to execute an action for the electronic file, determines that the metadata associated with the electronic file requires executing a custom action instead of the requested action, and therefore executes the custom action instead of the action (or prevents execution of the action). For example, continuing with the first example above (e.g., [X, delete], [Y, disallow action]), the remote device 102 can receive a request to delete the electronic file, but instead of deleting the file the remote device disallows the request (e.g., the custom action is performing no action).

In some embodiments, the remote device 102 can receive a request to execute an action for the electronic file, determines that the metadata requires executing the custom action in addition to the action for the electronic file, and executes the custom action in addition to the action. For example, continuing with the second example above (e.g., [X, save], [Y, create backup]), the remote device 102 can receive a request to save the electronic file, so using the metadata the remote device both saves the file and creates a backup of the file.

Figure 5:
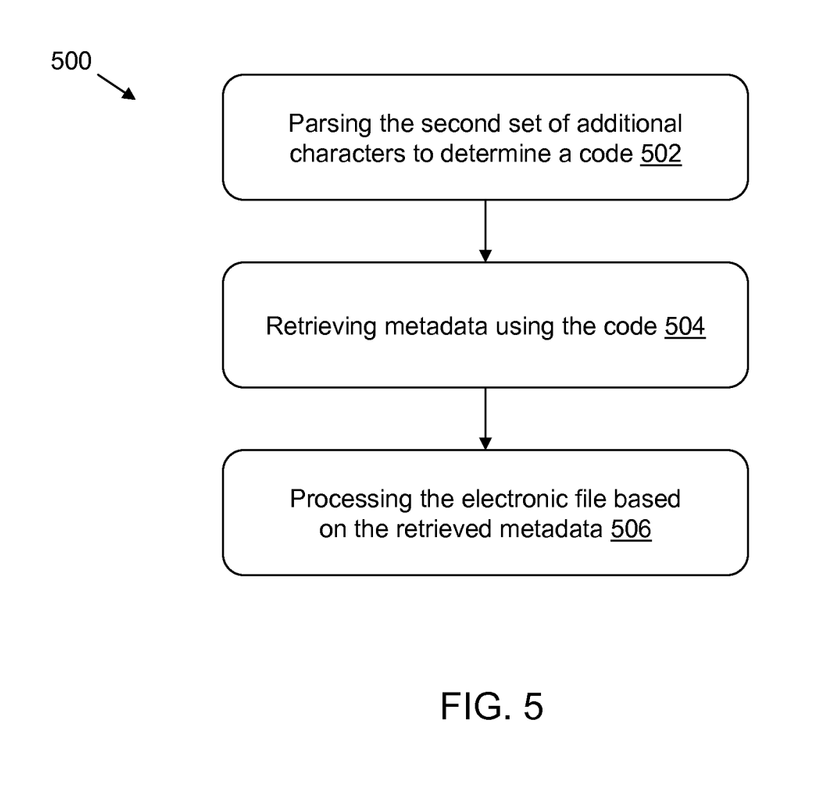
FIG. 5 is an exemplary flow chart of a computerized method for determining metadata associated with an electronic file based on a code in the filename.

Referring again to step 306 of FIG. 3, the filename 200 may include a code that the remote device 102 can use to determine the metadata associated with the file. FIG. 5 is an exemplary flow chart of a computerized method 500 for determining metadata associated with an electronic file based on a code in the filename 200. The method 500 is exemplary only, and can be modified by, for example, rearranging, altering, and/or omitting certain steps.

At step 502 the remote device 102 parses the additional characters 204 to determine a code. The code can be, for example, a unique identifier that the remote device 102 can use to retrieve additional information. The parsing can be performed as described above (e.g., with respect to step 304).

The code can be, for example, an identifier, link, encoded link, hash value, and/or any other code that points to a common repository that contains the metadata for the particular electronic file (e.g., stored on metadata server 108). For example, the code can form a hash of a link. In some embodiments, Bitly can be used to shorten a uniform resource locator (URL) (e.g., to the metadata repository) to a short URL (e.g., to a hash). In some examples, the code can be used to access a unique storage location for the filename. Referring to step 502, for example, the remote device 102 can access a URL based on the Bitly code to retrieve the metadata (e.g., whether it be accessing a shortened URL, or using the code to determine the full URL). In some embodiments, the hash can be an index into a table (e.g., stored on a common server) that stores the metadata associated with the hash. The metadata server 108 can be, for example, a server that conforms to the Representational State Transfer (REST) style constraints, and can allow metadata to be added, updated, and/or requested for a particular file (e.g., via the remote device 102).

Referring still to step 502, in some embodiments the code is an identifier that the remote device 102 can use to access a common repository that contains the metadata for the particular electronic file. For example, the remote device 102 can locally store the metadata, or the remote device 102 can be preconfigured to know the location of the metadata server 108. If locally stored, the remote device 102 can use the code to retrieve an entry in a metadata database that corresponds to the electronic file. If remotely stored, the remote device 102 can transmit the code to the metadata server 108 (which can be remote from the file server 104), and receive the metadata from the metadata server 108. In some examples, the metadata can be stored on the file server 104 itself, but separately from the electronic file.

At step 504, the remote device 102 can retrieve metadata from the metadata server 108 using the code. At step 506, the remote device 102 processes the electronic file based on the retrieved metadata.

Using the techniques described herein, the remote device 102 need only access the filename of an electronic file to determine the metadata associated with the electronic file (e.g., without downloading any content of the electronic files). Encoding information about the metadata in the filename itself can reduce the amount of data that must be transferred across the network 106 (e.g., which saves on bandwidth usage and cost, as well as time). In embodiments that use characters to encode metadata (e.g., as described above with reference to FIG. 4), the remote device 102 can determine additional functionality for an electronic file without downloading the file (e.g., to prevent deletion of the file, create backups of the file, download the file to a temporary location, etc.). Such features can be transferred with the file (e.g., since the name is preserved), so such metadata will apply to the electronic file regardless of where the file is located, and without needing to transfer additional data (e.g., such as metadata stored in the file itself). In embodiments that use a code to remotely locate metadata for the file (e.g., as described above with reference to FIG. 5), any amount of metadata can be remotely stored for an electronic file. The remotely stored metadata can provide a common metadata format, regardless of file type and where the electronic file itself is stored. Further, the metadata can be linked to the electronic file itself and therefore not to any particular server (e.g., Dropbox, Sharefile, SkyDrive etc.). For example, if the file is moved from Dropbox to Sharefile, the metadata need not be copied since it is located remotely from the electronic file and can be accessed regardless of the location of the electronic file.

The above-described techniques can be implemented in digital and/or analog electronic circuitry, or in computer hardware, firmware, software, or in combinations of them. The implementation can be as a computer program product, i.e., a computer program tangibly embodied in a non-transitory machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for determining metadata associated with an electronic file, the method comprising:
   receiving, by a computing device, a filename including a first set of characters that represents a name for the electronic file, and a second set of additional characters, the second set of additional characters comprising:
      a first character representative of an event associated with the electronic file; and
      a second character representative of a custom action for the event;
   parsing, by the computing device, the filename to identify the second set of additional characters, wherein the second set of additional characters does not represent either a filename for a second file or a location of the second file;
   determining, by the computing device, metadata associated with the electronic file based on the second set of additional characters without downloading additional data of the electronic file, the metadata comprising:
      first metadata that defines an event associated with the electronic file from a first metadata element from a set of metadata elements that comprises the first character, wherein each metadata element in the set of metadata elements comprises a character and metadata associated with the character, and wherein the set of metadata elements is stored separately from the electronic file; and
      second metadata that defines a custom action for the event from a second metadata element from the set of metadata elements that comprises the second character, and
   the metadata element for each character from the second set of additional characters is different than metadata elements associated with remaining characters from the second set of additional characters; and
   processing, by the computing device, the electronic file based on the determined metadata, further comprising:
      receiving a request to execute an action for the electronic file;
      determining the request matches the event defined by the first metadata;
      determining the second metadata requires executing the custom action in addition to the requested action for the electronic file, wherein the custom action is different than the requested action; and
      executing both the requested action and the custom action for the electronic file.

2. The method of claim 1, wherein executing the custom action comprises at least one of:
   creating a backup of the electronic file; and
   displaying a confirmation prompt.

3. The method of claim 1, wherein determining the metadata comprises:
   parsing the second set of additional characters to determine a code; and
   retrieving metadata from a remote server using the code.

4. The method of claim 3, wherein retrieving comprises:
   transmitting the code to a metadata server that is remote from a server containing the electronic file; and
   receiving, from the metadata server, metadata associated with the code.

5. The method of claim 3, wherein the code is a hash, and retrieving comprises retrieving the metadata from a metadata table based on the hash.

6. An apparatus for determining metadata associated with an electronic file, the apparatus comprising a processor and memory configured to:
   receive a filename including a first set of characters that represents a name for the electronic file, and a second set of additional characters, the second set of additional characters comprising:
      a first character representative of an event associated with the electronic file; and
      a second character representative of a custom action for the event;
   parse the filename to identify the second set of additional characters, wherein the second set of additional characters does not represent either a filename for a second file or a location of the second file;
determine metadata associated with the electronic file based on the second set of additional characters without downloading additional data of the electronic file, the metadata comprising:
first metadata that defines an event associated with the electronic file from a first metadata element from a set of metadata elements that comprises the first character, wherein each metadata element in the set of metadata elements comprises a character and element metadata associated with the character, and wherein the set of metadata elements is stored separately from the electronic file; and
second metadata that defines a custom action for the event from a second metadata element from the set of metadata elements that comprises the second character, and
the metadata element for each character from the second set of additional characters is different than metadata elements associated with remaining characters from the second set of additional characters; and
process the electronic file based on the determined metadata, further comprising:
receiving a request to execute an action for the electronic file;
determining the request matches the event defined by the first metadata;
determining the second metadata requires executing the custom action in addition to the requested action for the electronic file, wherein the custom action is different than the requested action; and
executing both the requested action and the custom action for the electronic file.

7. The apparatus of claim 6, wherein executing the custom action comprises at least one of:
creating a backup of the electronic file; and
displaying a confirmation prompt.

8. The apparatus of claim 6, wherein determining the metadata comprises:
parsing the second set of additional characters to determine a code; and
retrieving metadata from a remote server using the code.

9. The apparatus of claim 8, wherein retrieving comprises:
transmitting the code to a metadata server that is remote from a server containing the electronic file; and
receiving, from the metadata server, metadata associated with the code.

10. The apparatus of claim 8, wherein the code is a hash, and retrieving comprises retrieving the metadata from a metadata table based on the hash.

11. A computer program product, tangibly embodied in a non-transitory computer readable medium, the computer program product including instructions being configured to cause a data processing apparatus to:
receive a filename including a first set of characters that represents a name for the electronic file, and a second set of additional characters, the second set of additional characters comprising:
a first character representative of an event associated with the electronic file; and
a second character representative of a custom action for the event;
parse the filename to identify the second set of additional characters, wherein the second set of additional characters does not represent either a filename for a second file or a location of the second file;
determine metadata associated with the electronic file based on the second set of additional characters without downloading additional data of the electronic file, the metadata comprising:
first metadata that defines an event associated with the electronic file from a first metadata element from a set of metadata elements that comprises the first character, wherein each metadata element in the set of metadata elements comprises a character and element metadata associated with the character, and wherein the set of metadata elements is stored separately from the electronic file; and
second metadata that defines a custom action for the event from a second metadata element from the set of metadata elements that comprises the second character, and
the metadata element for each character from the second set of additional characters is different than metadata elements associated with remaining characters from the second set of additional characters; and
process the electronic file based on the determined metadata, comprising:
receiving a request to execute an action for the electronic file;
determining the request matches the event defined by the first metadata;
determining the second metadata requires executing the custom action in addition to the requested action for the electronic file, wherein the custom action is different than the requested action; and
executing both the requested action and the custom action for the electronic file.

12. The computer program product of claim 11, wherein executing the custom action comprises at least one of:
creating a backup of the electronic file; and
displaying a confirmation prompt.

* * * * *

UNITED STATES PATENT AND TRADEMARK OFFICE
CERTIFICATE OF CORRECTION

PATENT NO. : 9,697,218 B2  
APPLICATION NO. : 13/552988  
DATED : July 4, 2017  
INVENTOR(S) : Paul Keith Branton et al.

Page 1 of 1

It is certified that error appears in the above-identified patent and that said Letters Patent is hereby corrected as shown below:

In the Claims

Column 12, Line 4 (Claim 11, Line 6):
"represents a name for the electronic file, and a second" should be -- represents a name for an electronic file, and a second --

Signed and Sealed this
Nineteenth Day of September, 2017

Joseph Matal
*Performing the Functions and Duties of the
Under Secretary of Commerce for Intellectual Property and
Director of the United States Patent and Trademark Office*